(12) United States Patent
Holzwarth et al.

(10) Patent No.: US 7,026,594 B2
(45) Date of Patent: Apr. 11, 2006

(54) METHOD AND DEVICE FOR PRODUCING RADIO FREQUENCY WAVES

(75) Inventors: Ronald Holzwarth, Backnang (DE); Thomas Udem, Munich (DE); Theodor Hansch, Munich (DE)

(73) Assignee: Max-Planck-Gesellschaft Zur Forderung der Wissenschaft E.V., Munich (DE)

( * ) Notice: Subject to any disclaimer, the term of this patent is extended or adjusted under 35 U.S.C. 154(b) by 254 days.

(21) Appl. No.: 10/363,997

(22) PCT Filed: Sep. 5, 2001

(86) PCT No.: PCT/EP01/10238

§ 371 (c)(1),
(2), (4) Date: Jun. 24, 2003

(87) PCT Pub. No.: WO02/21647

PCT Pub. Date: Mar. 14, 2002

(65) Prior Publication Data

US 2004/0021056 A1    Feb. 5, 2004

(51) Int. Cl.
    G01J 1/44       (2006.01)
    H01J 40/14      (2006.01)
(52) U.S. Cl. .............. 250/206; 250/214 C; 372/16
(58) Field of Classification Search ........ 250/205–206, 250/214 R, 214 C, 461.1, 483.1, 484.2, 486.1, 250/487.1; 327/514; 372/16, 18; 356/317–318
    See application file for complete search history.

(56) References Cited

U.S. PATENT DOCUMENTS 4,840,456 A * 6/1989 Fye ........................... 359/566
5,929,430 A * 7/1999 Yao et al. .................... 250/205
6,008,931 A   12/1999 von Helmolt et al.
6,320,179 B1 * 11/2001 Cox et al. ................ 250/214 A
6,785,303 B1 * 8/2004 Holzwarth et al. ........... 372/16
2003/0160148 A1 * 8/2003 Yao et al. .................... 250/205

FOREIGN PATENT DOCUMENTS

DE    195 14 386 A1    10/1996
DE    199 11 103 A1     9/2000
EP    1 161 782 B1     10/2002
WO    WO 00/55948 A1    9/2000

OTHER PUBLICATIONS

C. Rulliere, Femtosecond Laser Pulses, Principles and Experiments, Springer, 1998, pp. 50-57.
K. Imai, et al., 30-THz Span Optical Frequency Comb Generation by Self-Phase Modulation in an Optical Fiber, IEEE Journal of Quantum Electronics, vol. 34, No. 1, Jan. 1998, pp. 54-60.

(Continued)

Primary Examiner—Stephone B. Allen
Assistant Examiner—Patrick J. Lee
(74) Attorney, Agent, or Firm—Caesar, Rivise, Bernstein, Cohen & Poktilow, Ltd.

(57) ABSTRACT

The invention relates to a method for producing radio frequency waves, whereby a pulse laser for producing light pulses having a predetermined spectrum of frequency modes and a predetermined recurrence frequency is operated. The light pulses of the pulse laser are detected by means of a detector device, and corresponding electrical output signals forming the radio frequency signals are produced. Said pulse laser is actuated in a stabilized manner by means of an optical reference signal in such a way that the recurrence frequency of the light pulse is fixed. The invention also relates to a radio frequency generator for implementing said method.

16 Claims, 1 Drawing Sheet

OTHER PUBLICATIONS

Figure 1:
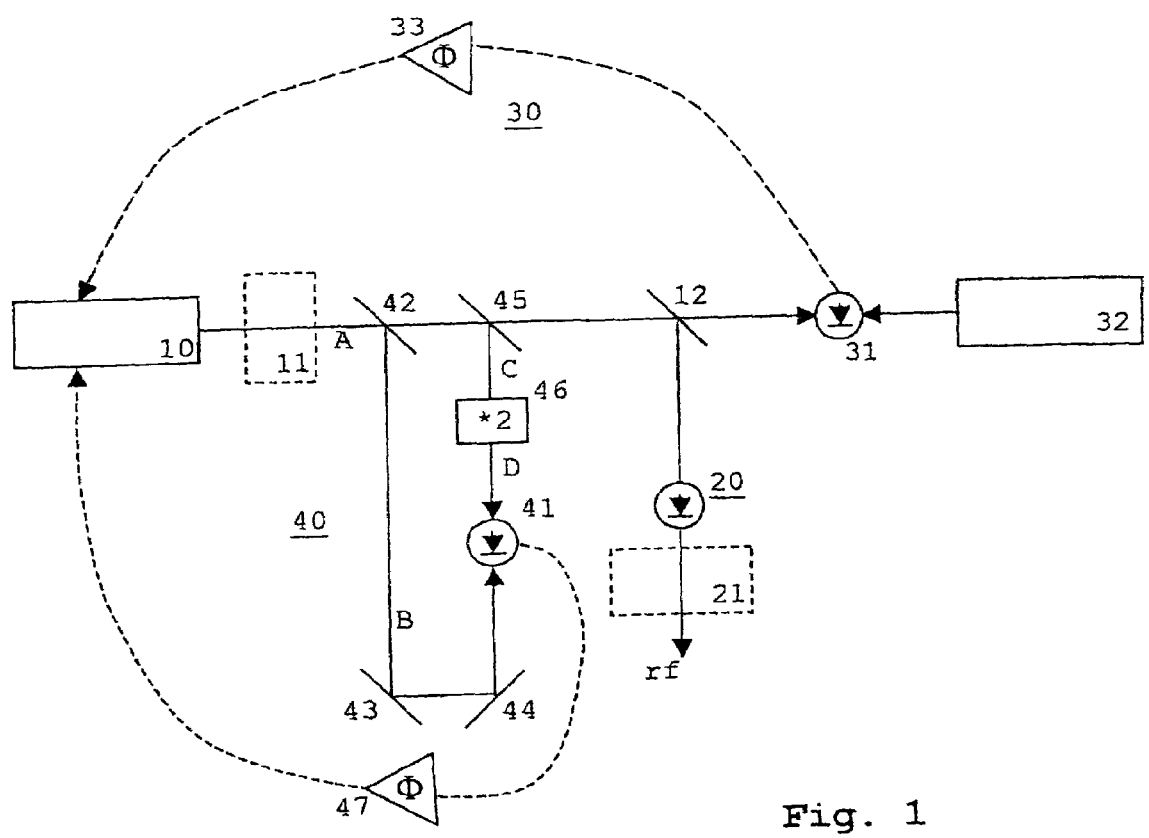

D. Mogilevtsev, et al.. Group-Velocity Dispersion in Photonic Crystal Fibers, Optics Letters, vol. 23, No. 21, Nov. 1, 1998; pp. 1662-1664.

T.A.Birks, et al., Endlessly Single-Mode Photonic Crystal Fiber, Optics Letters, vol. 22, No. 13, Jul. 1, 1997, pp. 961-963.

T.A.Birks, et al., Dispersion Compensation Using Single-Material Fibers, IEEE Photonics Technology Letters, vol. 11, No. 6, Jun. 1999, pp. 674-676.

J.N.Eckstein, et al., High-Resolution Two-Photon Spectroscopy with Picosecond Light Pulses, Physical Review Letters, vol. 40, No. 13, Mar. 27, 1978, pp. 847-850.

T.Udem, et al., Absolute Optical Frequency Measurement of the Cesium D1 Line with a Mode-Locked Laser, Physical Review Letters, vol. 82, No. 18, May 3, 1999; pp. 3568-3571.

S.N.Bagayev, et al., A Femtosecond Self-Mode-Locked Ti:sapphire Laser With High Stability of Pulse-Repetition Frequency and its Applications, Appl. Phys. B 70, Springer-Verlag 2000, pp. 375-378.

B.Willke, Frequency Stabilization of a Monolithic Nd:YAG Ring Lasre by Controlling the Power of the Laser-Diode Pump Source, Optics Letters, vol. 25, No. 14, Jul. 15, 2000, pp. 1019-1021.

G.Galzerano, High-Frequency-Stability Diode-Pumped Nd:YAG Lasers with the FM Sidebands Method and Doppler-Free Iodine Lines at 532 NM, Applied Optics, vol. 38, No. 33, Nov. 20, 1999, pp. 6962-6966.

M.Al-Mumin, et al., Optical Generation and Sideband Injection Locking of Tunable 11-120GHz Microwave/Millimetre Signals, Electronics Letters, vol. 36, No. 18, Aug. 31, 2000, pp. 1547-1548.

International Search Report re PCT/EP 01/10238 dated Feb. 7, 2002.

* cited by examiner

METHOD AND DEVICE FOR PRODUCING RADIO FREQUENCY WAVES

DESCRIPTION

The invention concerns a method for the producing of radio frequency waves, especially, a procedure for the generating of electrical signals of said radio frequency, which can be made available as an output signal of a light detector, which receives laser pulses in the ultra short range. The invention also concerns a radio frequency generator, with which the said method can be realized and find utilization in the production of radio frequencies.

Radio frequency waves are electromagnetic waves of characteristic wave lengths, in the range of 0.01 to 100 cm and possess characteristic frequencies (rf-frequencies) in the range of 1 MHz to 100 GHz. Radio frequency waves of these properties are applied in signal transmission technology, and in spectroscopic investigative methods such as solid body spectroscopy or resonance spectroscopy. For the production of radio frequency waves up to now, cavity resonators or quartz oscillators have been used, which could be tuned to desired output frequencies. The conventional generators have the disadvantage of a limited frequency stability. Thus, for instance, quartz oscillators have a natural stability limit due to growth faults of the piezo-electric quartz, which is characterized by a relative frequency stability of $10^{-13}$ (in one second). This stability can be improved by applying special measures. For example, with helium cooled, sapphire-oscillators, a relative stability of $10^{-14}$ (in one second) can be achieved. This, however, requires a complex equipment, which, for most practical uses, is unacceptable.

Thus the purpose of the invention is to bring about an improved method for the generation of radio frequencies, in which the radio frequency waves possess a greater stability and which can be achieved by a relatively simply constructed generator. The invented method should enable a frequency production with a relative stability of at least $10^{-13}$. A second purpose of the invention is to make available an improved radio frequency generator, which can be applied for the execution of the method.

The invented radio frequency generator should characterize itself especially by a high frequency stability and have a compact construction, which is robust and easily maintained.

These purposes are achieved by a method and a radio frequency generator with the respective features of claim 1 and claim 9. Advantageous embodiments and applications of the invention become evident in the subordinate claims.

The fundamental concept of the invention, is to produce radio frequency waves of at least one radio frequency, which corresponds to a separation from the frequency modes of the spectrum of short laser-light pulses. The light pulses are produced by a pulse-laser, the repetition rate of which is stabilized, and directed to a detector apparatus. In the electrical output signal of the detector apparatus, are to be found frequency components corresponding to the mode-separations in the frequency spectrum. The repetition frequency stabilization of the pulse laser is effected by phase coupling of at least one frequency mode of the light pulse of the pulse laser with at least one highly stable reference frequency, or by the capture of an optical reference signal. A particularly high degree of stability of the radio frequency is achieved, when not only the repetition of the pulse laser, but also the so called offset frequency (see below) of the frequency components in the mode-spectrum are stabilized.

In accord with preferred embodiments of the invention, a reference signal is formed by a stabilized reference laser or, under certain conditions, by an incited atomic transition.

The object of the invention is also to create:
- a radio frequency generator with a pulse laser for the production of light pulses,
- a detector apparatus for the generation of an electrical output signal in radio frequencies and
- an apparatus for the stabilization of the pulse laser, with which, at least the repetition frequency, or optionally the offset frequency, can determine the light pulse.

The invention possesses the following advantages. Since the radio frequency is derived from at least one generator frequency, which is fixed by means of phase coupling with a stabilized optical reference frequency or a control on the basis of an optical reference signal, then the radio frequency can be produced with relative stability, which corresponds to the relative stability of the reference signal. Optical reference frequencies with relative stability can be produced with relative stabilities better than $10^{-14}$. The construction of the invented radio frequency generator is compact, and, especially can be implemented as a mobile, low-maintenance system by the use of a diode-pumped solid state laser or a ring laser by employing a pulse laser for pulse generation. With the invention, simultaneously there is achieved both an increase in the stability of the frequency as well as a diminishing of the cost of the apparatus in the production of radio frequencies.

Further advantages and details become evident from the description from the attached drawing.

FIG. 1 shows a schematic general presentation of an invented radio frequency generator.

The Characteristics of an Ultra Short Light Pulse

The method of production of ultra short, laser-light pulses, which method has been known for some 70 years, (ultra short referring to a light pulse with a characteristic duration of pulse in the ns to the fs range) is based on the so-called mode-synchronization. In a laser medium, with sufficient breadth of band of the laser transition in the resonator, many inherent vibrations can be incited at various frequencies. If, by means of an appropriate mechanism placed between the inherent vibrations, a firm phase relationship is (mode-synchronization) achieved, then an occurrence of the emission of short light pulses is brought about with a time-duration of T, which is equal to the quotients of double resonance length and average running speed of the pulse and a spectral combination corresponding to those optical frequencies which are incited in the resonator and are contributory to the formation of pulses.

Upon the construction of the curve of the intensity of the pulse formed laser radiation in the frequency cavity, there is activated a mode spectrum (or frequency comb) which, by means of δ-similar functions is formed by the optical frequencies contributing to each pulse and the incorporation of this within the band width of the laser transition lies within the laser medium. The breadth of that which is incorporated is, essentially, in inverse proportionality to the duration of the pulse. Each frequency contribution to a frequency comb of this kind will be designated here as "Frequency Mode M".

The frequency separation of the elements of the frequency comb correspond to the longitudinal, laser mode, integer multiple of the pulse-repetition frequency, namely $f_r = \tau^{-1}$ (repetition rate). The comb structure of fs-pulses in the frequency cavity for instance, is described in "Femtosecond Laser Pulses", (Publisher C. Rulliere, Springer Verlag, Berlin 1998). The frequency components, which are separated by integer multiples of the repetitive frequency $f_x$ do not permit themselves, in their absolute frequency state, to be presented as integral multiples (n) of the repetition frequency, but by the sum $(n \cdot f_r + f_o)$ which is "n" times the repetitive frequency $f_r$ plus the offset—or phase-slip frequency $f_o$—which, for all frequency components, is the same value, corresponding to the quotients from the respective phase differences from pulse to pulse by the rotation time $(2\pi)\tau$.

The repetitive frequency of the light pulse, and therewith the frequency separation of the Modes, lies in the frequency range of radio frequencies. If the light pulses are captured by a detector apparatus, which, in accord with the detected light intensity, itself generates output signals, then the output signals contain frequency components agreeing with the individual frequency modes, that is, oscillatory frequencies between the frequency modes, which precisely represent the desired radio frequencies. In accord with the invention, it is now possible to stabilize the pulse repetition frequency of the pulse laser with reference to an optical frequency standard, as will be described below.

Radio Frequency Generator

FIG. 1 shows, schematically, the construction of an invented radio frequency generator 100 with:

a pulse laser 10, a first detector apparatus 20, and a circuit 30 for repetitive frequency stabilization.

There is also an optional apparatus 40 presented for offset stabilization. The apparatus 40 offers no compelling feature to characterize the invention, but does present an additional improvement of the radio frequency stability. The pulse laser 10 can be made as any conventional pulse laser with a typical pulse duration in the nanosecond, femtosecond range. The pulse laser 10, for example, can be designed as a Titanium Sapphire Laser (such as "Coherent Mira 900", pulse length 73 femtoseconds, repetitive frequency $f_r = 75$ MHz), or a ring laser, or a diode pumped, solid state laser (such as a Chromium-Lithium-SAF-Laser). The pulse laser 10, preferably, is a compact. portable, battery driven apparatus.

The pulse laser 10 is optionally connected with a device for the broadening of the laser pulse by means of self-phase modulation (drawn in with dashed lines, reference number 11). The device 11, designed for pulse broadening, is, for example, an optical Single-Mode-Fiber. The self phase modulation is described by K. Imai in "IEEE Journal of Quantum Electronics", Vol. 34, 1998, page 54ff. A particularly strong broadening of the mode comb is achieved by the use of structured optical fibers, which possess a fiber core and an axially running, concentric, thin air channel enclosing said fiber core. For description, see D. Mogilevetsev at al., in "Optics Letters" Vol. 23, 1998, page 1662ff, and/or T. A. Burks in "Optics Letters" Vol. 22, 1997, page 961ff, or again T. A. Burks in "IEEE Photonics Letters", Vol. 11, 1999, page 647ff.

The detector 20 is a light sensitive element, such as, for example, a photo-diode or a photo-multiplier. A portion of the output pulse of the pulse laser 10, (that is to say, the device 11) is deflected through the partially transparent mirror 12 onto the first detector 20, the output signal (rf) whereof forms the desired radio frequency waves, or contains radio frequency. Further apparatuses 21 can connectedly follow the detector 20 for the purpose of signal formation. Such signaling could be, for example, a filtering of the output signal and/or can entail an amplification thereof. For the amplification of an output signal, a phase coupling with a conventional microwave oscillator (not shown) can be provided on the output signal of the detector 20 or a conventional semiconductor can be installed. The phase coupling is carried out in a manner analogous to the explained control circuits for the stabilization of lasers.

The circuit 30 for frequency stabilization of the pulse laser 10 includes a second detector 31, a reference frequency generator 32 for the production of an optical reference signal and a control amplifier 33.

The second detector 31 is likewise a light sensitive element (for example, a photo detector or a photo multiplier).

The reference frequency generator 32 is generally designed to assure the availability of a light signal with at least one frequency component, the frequency stability of which, is at least as high, as the stability of the radio frequencies to be generated should be. In accord with each embodiment of the invention, the reference generator can be constructed with a stabilized, continuous wave laser, a reference damping cell or an arrangement with a free atomic beam.

As an continuous wave laser with stabilized optical frequency the following can be used:

a methane-stabilized helium-neon laser (output frequency 88 THz) (if necessary with a non-linear frequency multiplier for frequency matching at least at one mode of the light pulse of the pulse laser 10, or an iodine stabilized YAG Laser.

On the second detector 31 is carried out the simultaneous capture of a mode of the laser pulse and the reference frequency. In the case of a very small deviation between the two frequencies, there arises an oscillating signal, which is emitted as an output signal of the second detector 31 by the control amplifier 33 to the pulse laser 10. The pulse laser 10 is equipped with a device for the control of the repetitive frequency. This device is controlled in such a manner, that the said oscillating signal of the second detector 31 vanishes, or represents a predetermined reference frequency. In this case the chosen frequency mode of the mode spectrum relative to the reference frequency of the reference frequency generator is set. In accord with this, the output signal of the first detector 20 is stabilized with the stability of the reference frequency generator 32.

Upon the construction of the reference frequency generator as a reference damping cell, the pulse laser 10, is stabilized in reference to the optical frequency of the atomic transition, which is excited under certain circumstances.

The reference damping cell is, for example, a cell which is temperature controllable (for instance, iodine or rubidium cells). By means of the adjustment of the cell temperature, there is brought about in the reference cell a defined vapor pressure, which determines the location and the breadth of the atomic transition.

What is provided, advantageously, is a Doppler-free optical excitation of the vapor corresponding to the 2-photon spectroscopy, to the saturation spectroscopy or the polarisation spectroscopy.

The excitation is done, for example, with self reversed light pulses of the laser 10 running through the reference cell, as it has been described by J. N. Eckstein, A. I. Ferguson and T. W. Hansch in "Physical Review Letters", Vo. 40, 1978, p 847ff. The laser pulses are run through the cell in two opposite directions, in such a manner, that upon the collision of two light pulses, immediately a 2-photon transition can be incited, the total energy of which composes itself out of two partial amounts, which correspond exactly to two self-increasing frequency components in the mode spectrum of the light pulse. This excitation procedure enables a high resolution spectroscopy, since the Doppler extension of the observed transition is avoided. For the Doppler-free excitation, at a given distance from the reference cell, a plane mirror (not shown) is provided, with which the counter-running light pulses can be produced.

Alternative to the illustrated control on the basis of an oscillatory signal, for instance a 2-photon-fluorescence from the reference cell can be used directly as a adjusting signal for the control of the repetition frequency. The repetitive frequency is always exactly so set, that a fluorescent signal will be captured by the detector 31.

The setting of the repetitive frequency in the pulse laser 10 is done in a known manner by means of the adjustment of the resonator length or of the capacity of the pump. A pump capacity control is preferred, since this is done electro-optically without any mechanical movement. The enables quick changing of the repetitive frequency and thereby a greater band width for the setting of the pulse laser 10.

For the optionally provided apparatus 40 for offset frequency stabilization, the laser pulse A which is emitted from the pulse laser 10, and if necessary, subjected to self-phase modulation in the appropriate modulator 11, is subdivided, by beam splitting semi-mirrors 42 to 45 into various spectral divisions B and C.

For this purpose, at least one of the mirrors 42, 43 or 45 is designed for the spectral selective deflection of beam components of the light pulse A. For instance, it is provided, that the portion B contains components of higher frequency of the mode spectrum and the portion C has lower frequency components of the mode spectrum. For the making available of a sufficiently strong oscillatory signal, at the third detector 41, the frequencies of the portions B and C are tuned to one another by a frequency multiplier or divider 46. In the case of the said example (C=lower frequency portion) the component 46 is a frequency multiplier. The component 46 is a multiplier or a divider stage for optical frequencies, as these are known from the state of the technology.

A particularly simple design becomes possible, in such a case in the modem spectrum the laser pulse bridges a complete frequency octave. In this case, the component 46 is an optical, non-linear crystal for the frequency doubling (or halving). After the penetration through the frequence multiplier (component 46), then there exists a frequency-shifted beam portion D. The beam portions B and D are simultaneously directed to the detector 41. Upon the simultaneous incidence of the beam portions, then, at the detector 41, an electrical output signal is produced, in accord with the deviation of the frequency component(s) of the beam parts B and D. This electrical output signal carries a defined oscillatory frequency. The output signal is given to the first control amplifier 47, which activates a known apparatus for the setting of the offset frequency of the pulse laser. For instance, with the control amplifier 47, the introduction of a linear dispersion in the resonator of the pulse laser 10 is controlled, as it is described in the not yet published PCT/EP00/02135 or as described in the publication of T. Udem et al., in Physical Review Letters", Vol. 82, 1999, Page 3568ff. A pump capacity control for the setting of the offset frequency possessed indeed the advantage, that the control is carried out electro-optically without mechanical movements. In this situation, the repetition frequency is regulated by means of the resonator.

In accord with a converse embodiment example, the portion B can contain the low frequency components and the portion C the higher frequency components, whereby the component 46 can then be designed for frequency division. Alternatively, also the apparatus for the frequency multiplication or division can be provided in any other branch of the beam splitters 42 to 45.

In accord with yet another diversive change, the mirrors 42 to 45 can be replaced by other, similarly active beam splitters, such as prisms. Additionally, in the presented course of the beams, the portions A, B and C can be provided with optical filters and, if required, be given a time-delay for the tuning of the incident penetration of the beam portions at the detector.

APPLICATIONS

The radio frequency generator 10, in accord with the invention, with advantage, can be implemented into all applications, which are known in the technologies of signaling, spectroscopy, and time measuring. Especial advantages arise in applications, in which a low phase noise is desired, for instance, in radar technology, or as radio frequency standards in time technology or spectroscopy.

The disclosed features in the foregoing description, the drawing and the claims, can be meaningful just as well standing on their own as in optional combinations for the realization of the invention in its various embodiments.

Claimed is:

1. A method for the production of radio frequency waves, comprising the steps of:
    operating a pulse laser for the production of light pulses with a predetermined spectrum of frequency modes and a predetermined repetitive frequency wherein the frequency modes of the spectrum have predetermined mode distances;
    stabilizing the pulse laser with an optical reference signal such that the repetitive frequency of the light pulses is fixed;
    capturing light pulses of the pulse laser with a first detector; and
    generating corresponding electrical output signals, which include radio frequency components corresponding to the mode distances, which radio frequency components form the radio frequency waves.

2. A method in accord with claim 1, in which the frequency stabilization is carried out by a control circuit, in which, the repetitive frequency of the pulse laser is adjusted, dependent upon an oscillatory signal captured by a second detector from at least one first frequency mode of the light pulse of the pulse laser, and from an optical reference frequency, which forms the optical reference signal.

3. A method in accord with claim 2, wherein the optical reference frequency is produced by a stabilized reference laser.

4. A method in accord with claim 2, in which the optical reference signal is produced with a reference damping cell, in which an atomic transition is incited under predetermined conditions.

5. A method in accord with claim 1, wherein the frequency stabilization is executed by a control circuit in which the repetitive frequency of the pulse laser is fixed, dependent upon a fluorescent signal emanating from a reference damping cell which is captured by a second detector, wherein an atomic transition is optically excited under predetermined conditions.

6. A method in accord with claim 1, wherein a diode-pumped, solid state laser, or a ring laser is employed as a pulse laser.

7. A method in accord with claim 1, in which a broadening of the spectrum of the frequency modes of the light pulse is done by means of self-phase modulation.

8. A method in accord with claim 1, in which is provided a stabilization of the offset-frequency of the frequency components of the light pulse produced by the pulse laser.

9. A radio frequency generator, comprising:
- a pulse laser for the production of light pulses with a predetermined spectrum of frequency modes and a predetermined repetitive frequency, wherein the frequency modes of the spectrum have predetermined mode distances;
- a first detector which is designed to produce from the light pulses of the pulse laser electrical output signals, which include radio frequency components corresponding to the mode distances, which radio frequency components form radio frequency waves; and
- a circuit for frequency stabilization of the pulse laser relative to an optical reference signal with which the repetitive frequency of the light pulses can be fixed.

10. A radio frequency generator in accord with claim 9, in which the pulse laser has a device for the establishment of the repetitive frequency and the frequency stabilization circuit contains a second detector and a reference frequency generator, wherein the second detector is designed for the purpose of capturing simultaneously the light pulse of the pulse laser and the optical reference signal as a reference frequency, and to produce an oscillatory signal, with which the equipment can be made controllable for the fixing of the repetitive frequency.

11. A radio frequency generator accord with claim 10, in which the reference frequency generator is comprised of a stabilized continuous wave laser.

12. A radio frequency generator in accord with claim 10, wherein the pulse laser possesses an element for the fixing of the repetitive frequency and the frequency stabilization circuit has a second detector and an optical reference cell for the production of the optical reference signal, wherein the said second detector is designed for the purpose of capturing the optical reference signal as a fluorescent signal of the reference signal and to produce an output signal, with which the said element for the fixing of the repetitive frequency is controllable.

13. A radio frequency generator in accord with claim 9, in which the pulse laser consists of a diode pumped solid state laser or a ring laser.

14. A radio frequency generator in accord with claim 9, in which an apparatus is provided for the broadening of the spectrum of the frequency modes of the light pulse.

15. A radio frequency generator in accord with claim 14, in which the broadening apparatus is constructed of an optical fiber.

16. A radio frequency generator in accord with claim 9, in which is provided the circuit for the frequency stabilization of the pulse laser, whereby the frequency components of the light pulses can be fixed.

\* \* \* \* \*